(12) United States Patent
Nakahara (10) Patent No.: US 9,219,864 B2
(45) Date of Patent: Dec. 22, 2015

(54) ZOOM LENS AND IMAGE PICKUP APPARATUS INCLUDING THE SAME

(71) Applicant: CANON KABUSHIKI KAISHA, Tokyo (JP)

(72) Inventor: Makoto Nakahara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/451,498

(22) Filed: Aug. 5, 2014

(65) Prior Publication Data

US 2015/0077594 A1 Mar. 19, 2015

(30) Foreign Application Priority Data

Aug. 5, 2013 (JP) ................. 2013-162437

(51) Int. Cl.
H04N 5/232 (2006.01)
H04N 5/228 (2006.01)
G02B 27/64 (2006.01)
G02B 15/173 (2006.01)

(52) U.S. Cl.
CPC .......... *H04N 5/23287* (2013.01); *G02B 15/173* (2013.01); *G02B 27/646* (2013.01); *H04N 5/23296* (2013.01); *G03B 2205/0015* (2013.01)

(58) Field of Classification Search
USPC ................. 348/208.4, 208.7, 208.11, 208.12; 396/55
See application file for complete search history.

(56) References Cited

U.S. PATENT DOCUMENTS

| 5,731,897 A * | 3/1998 | Suzuki ........................... 359/557 |
| 5,917,663 A * | 6/1999 | Suzuki ........................... 359/749 |
| 2005/0243438 A1* | 11/2005 | Hamano et al. ............... 359/692 |
| 2013/0010174 A1* | 1/2013 | Shinohara et al. ............. 348/335 |

FOREIGN PATENT DOCUMENTS

JP 2007-78834 A 3/2007
JP 2009-251112 A 10/2009

* cited by examiner

Primary Examiner — Sinh Tran
Assistant Examiner — Mark Monk
(74) Attorney, Agent, or Firm — Carter, DeLuca, Farrell & Schmidt, LLP (57) ABSTRACT

The zoom lens includes: a positive first lens unit; a positive second lens unit disposed in an image side of the first lens unit, at least a part of the second lens unit constituting an image stabilizing lens unit configured to move with a component perpendicular to an optical axis; the zoom lens being configured to change an interval between neighboring lens units during zooming; and an aperture stop arranged in the image side of the first lens unit, wherein a focal length of the first lens unit, a focal length of the image stabilizing lens unit, a focal length at a wide angle end of an optical system Lr arranged on the image side of the image stabilizing lens unit, and a focal length of an entire system at the wide angle end are appropriately set.

10 Claims, 7 Drawing Sheets

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for an imaging optical system used for image pickup apparatus such as a digital camera, a video camera, a TV camera, a monitoring camera, and a silver-halide film camera.

2. Description of the Related Art

An imaging optical system used for an image pickup apparatus (camera) is required to be a small zoom lens having a wide angle of field and high resolution power. In addition, because various optical members such as a low pass filter and a color correction filter are arranged between a lens rearmost portion and a solid-state image pickup element, it is required that a back focus of the zoom lens is relatively long. Further, the zoom lens is required to have an image stabilizing mechanism for correcting an image blur that is generated when an accidental vibration such as shaking is transmitted to the zoom lens.

As a zoom lens having a relatively long back focus and a wide angle of field, there is known a negative lead type zoom lens including a lens unit having a negative refractive power arranged on a most object side. As the negative lead type zoom lens, there is known a four-unit zoom lens that includes a first lens unit to a fourth lens unit having negative, positive, negative, and positive refractive powers in order from an object side to an image side, and includes an image stabilizing mechanism.

A zoom lens described in Japanese Patent Application Laid-Open No. 2007-78834 includes, in order from the object side to the image side, a first lens unit to a fourth lens unit having negative, positive, negative, and positive refractive powers, in which a positive lens as a part of the second lens unit is moved in a direction perpendicular to an optical axis so as to correct image blur. In addition, there is known a five-unit zoom lens that is a negative lead type zoom lens including, in order from the object side to the image side, a first lens unit to a fifth lens unit having negative, positive, positive, negative, and positive refractive powers, and includes an image stabilizing mechanism. A zoom lens described in Japanese Patent Application Laid-Open No. 2009-251112 includes, in order from the object side to the image side, a first lens unit to a fifth lens unit having negative, positive, positive, negative, and positive refractive powers, in which the fourth lens unit is moved in the direction perpendicular to the optical axis so as to correct image blur.

When the image stabilizing lens unit is moved in the direction perpendicular to the optical axis in order to correct image blur, a zoom lens having a small and light-weight image stabilizing lens unit is required for reducing size and power consumption of the image stabilizing mechanism. For instance, if a diameter of the image stabilizing lens unit is increased, lens weight is increased, and a size of a lens frame for holding the lens is also increased. Therefore, a load is imposed on a drive system for performing image stabilization, and hence the drive system becomes large. As a result, the entire apparatus becomes large.

SUMMARY OF THE INVENTION

According to one embodiment of the present invention, there is provided a zoom lens, including: a first lens unit having a negative refractive power; a second lens unit having a positive refractive power disposed in an image side of the first lens unit, at least a part of the second lens unit constituting an image stabilizing lens unit configured to move to have a component perpendicular to an optical axis for image stabilization; the zoom lens being configured to change an interval between neighboring lens units during zooming; and an aperture stop arranged in the image side of the first lens unit, in which the following conditional expressions are satisfied:

$$6.0 < f_{Ls}/f_W < 30.0; \text{ and}$$

$$-3.0 < f_{Lr}/f_1 < -2.0,$$

where $f_1$ represents a focal length of the first lens unit, $f_{Ls}$ represents a focal length of the image stabilizing lens unit, $f_{Lr}$ represents a focal length at a wide angle end of an optical system Lr arranged on the image side of the image stabilizing lens unit, and $f_W$ represents a focal length of an entire system at the wide angle end.

Further features of the present invention will become apparent from the following description of exemplary embodiments with reference to the attached drawings.

DESCRIPTION OF THE EMBODIMENTS

Now, exemplary embodiments of the present invention are described in detail with reference to the attached drawings. A zoom lens of the present invention includes, in order from an object side to an image side, a first lens unit having a negative refractive power, and a second lens unit having a positive refractive power, in which an interval between neighboring lens units varies during zooming. The zoom lens includes an aperture stop on the image side of the first lens unit, and an image stabilizing lens unit including at least a part of the second lens unit, which is configured to move so that image stabilizing lens unit has a component perpendicular to an optical axis for image stabilization.

Figure 1:
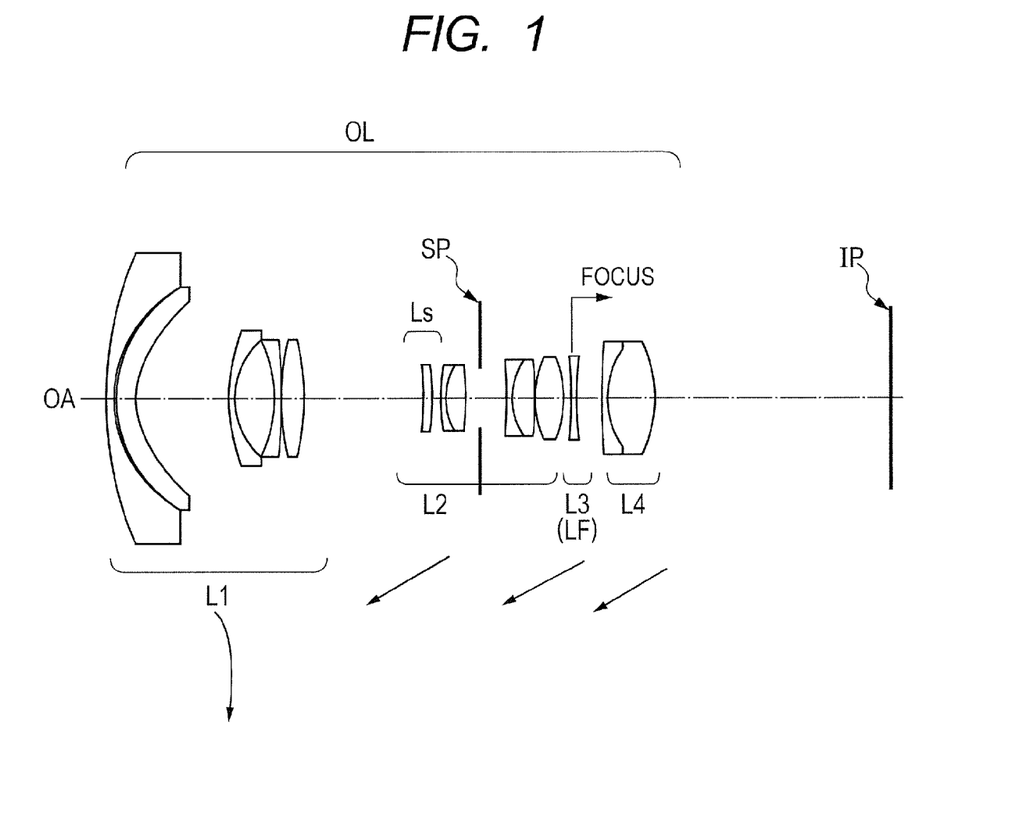
FIG. 1 is a lens cross-sectional view at a wide angle end of a zoom lens of Embodiment 1.
Figure 2A:
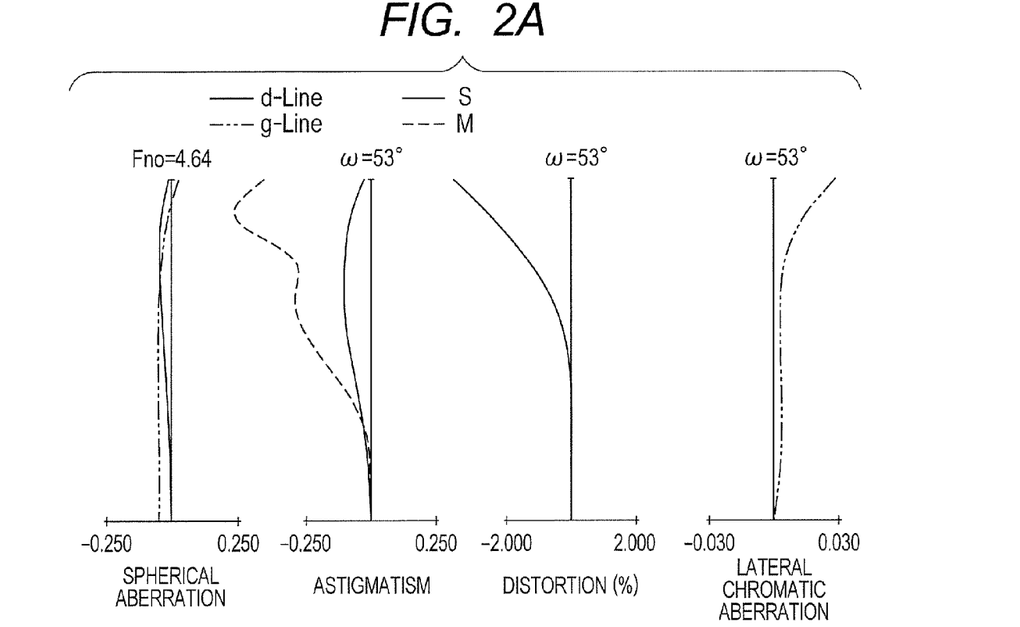
FIG. 2A is a longitudinal aberration diagram in focus at infinity at the wide angle end of the zoom lens of Embodiment 1.
Figure 2B:
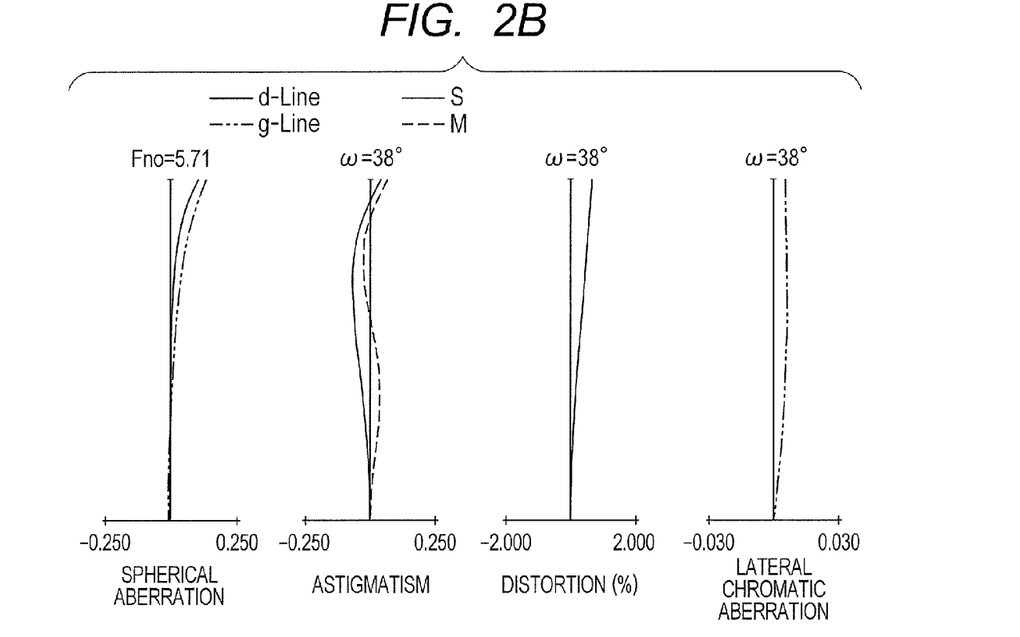
FIG. 2B is a longitudinal aberration diagram in focus at infinity at a telephoto end of the zoom lens of Embodiment 1.

FIG. 1 is a lens cross-sectional view at a wide angle end (short focal length end) of a zoom lens according to Embodiment 1 of the present invention. FIG. 2A and FIG. 2B are longitudinal aberration diagrams in focus at infinity at the wide angle end and at a telephoto end (long focal length end), respectively, of the zoom lens of Embodiment 1.

Figure 3:
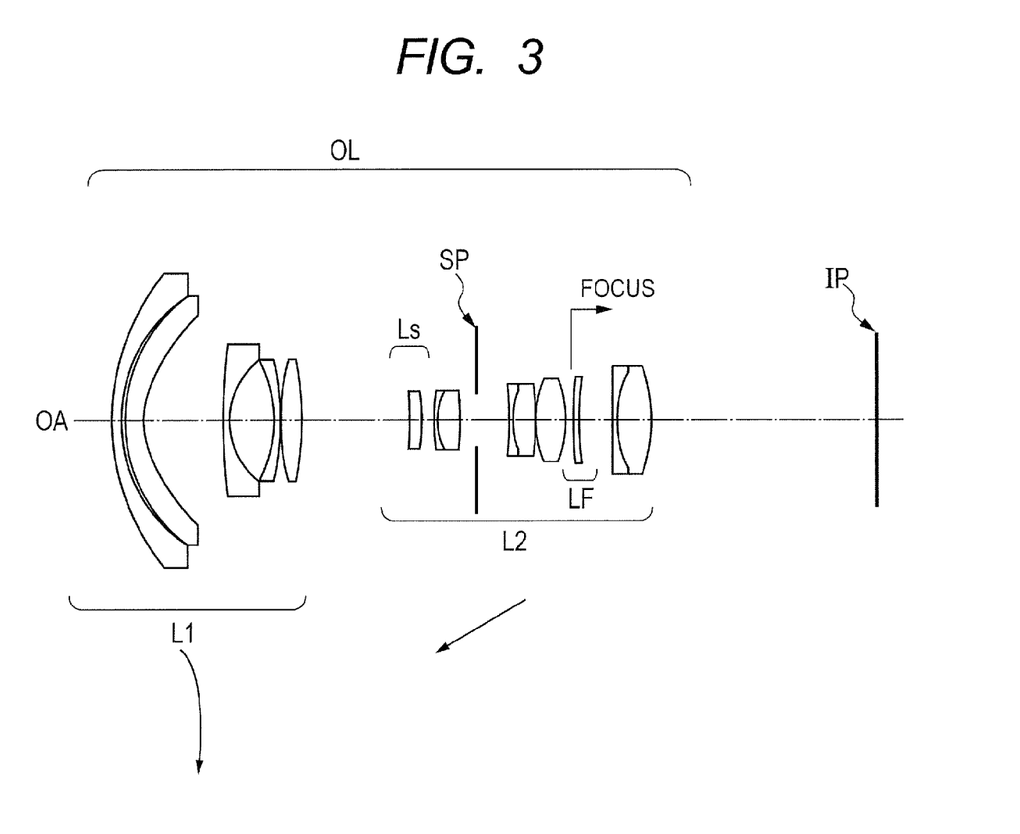
FIG. 3 is a lens cross-sectional view at a wide angle end of a zoom lens of Embodiment 2.
Figure 4A:
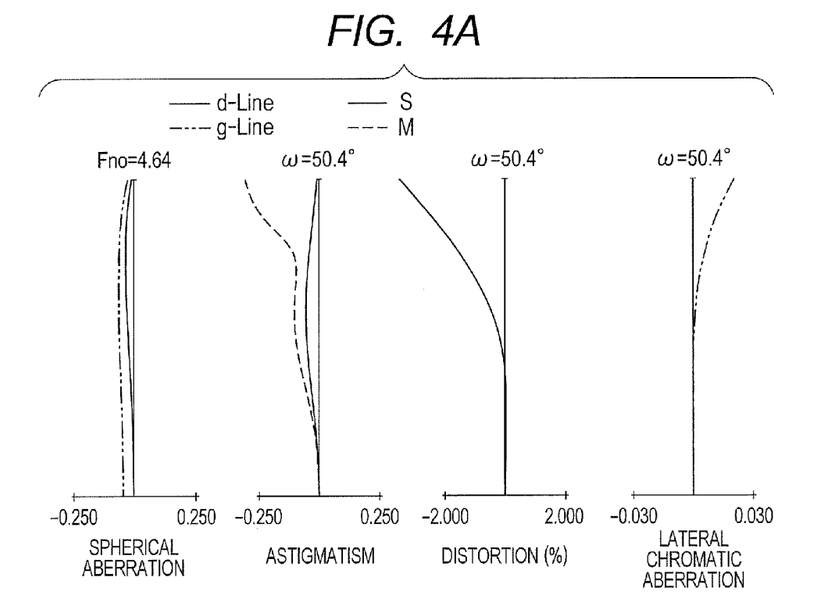
FIG. 4A is a longitudinal aberration diagram in focus at infinity at the wide angle end of the zoom lens of Embodiment 2.
Figure 4B:
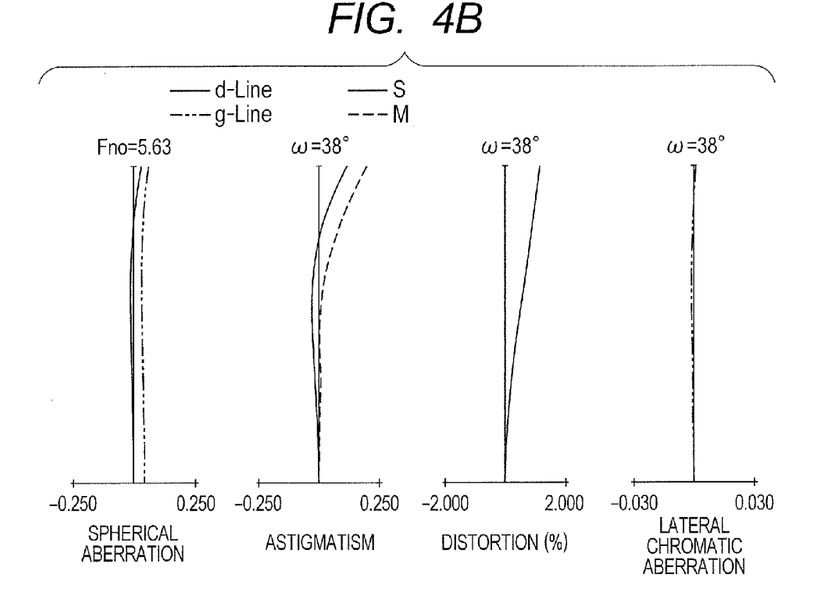
FIG. 4B is a longitudinal aberration diagram in focus at infinity at a telephoto end of the zoom lens of Embodiment 2.
Figure 5:
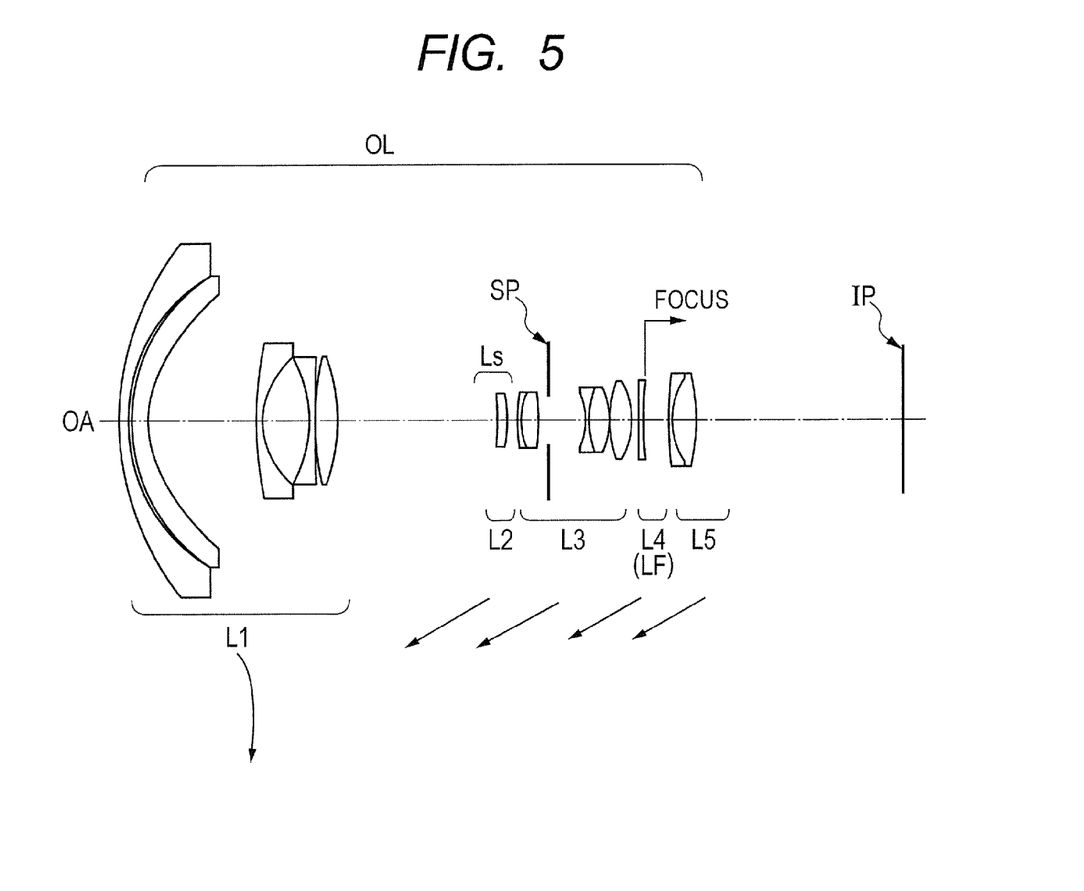
FIG. 5 is a lens cross-sectional view at a wide angle end of a zoom lens of Embodiment 3.
Figure 6A:
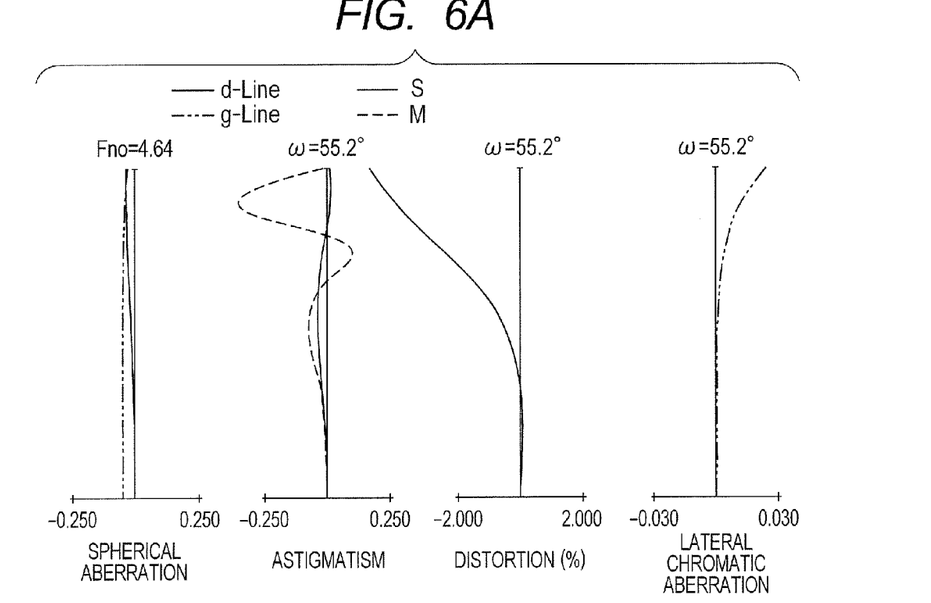
FIG. 6A is a longitudinal aberration diagram in focus at infinity at the wide angle end of the zoom lens of Embodiment 3.
Figure 6B:
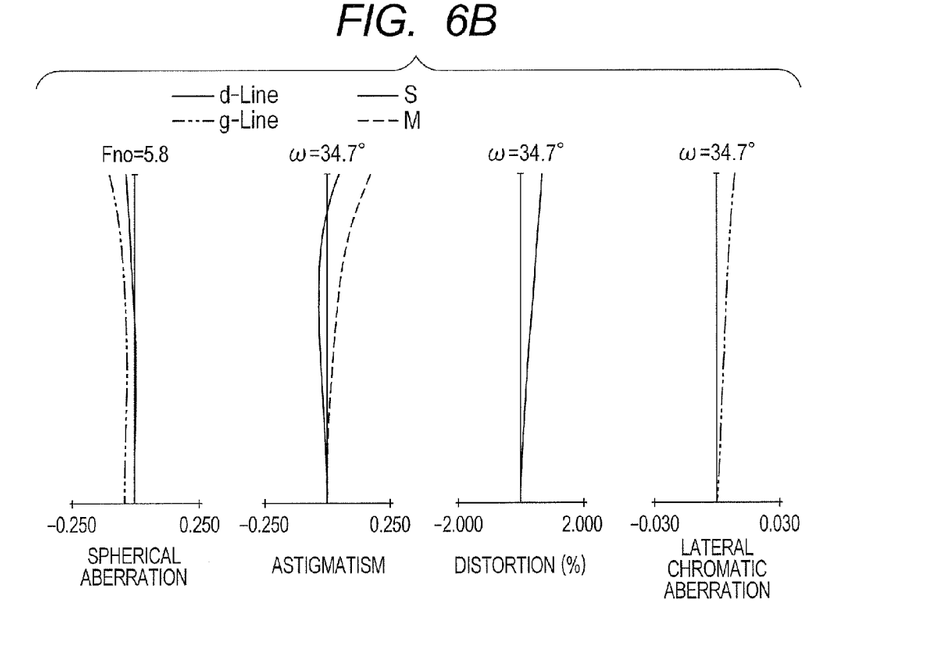
FIG. 6B is a longitudinal aberration diagram in focus at infinity at a telephoto end of the zoom lens of Embodiment 3.
Figure 7:
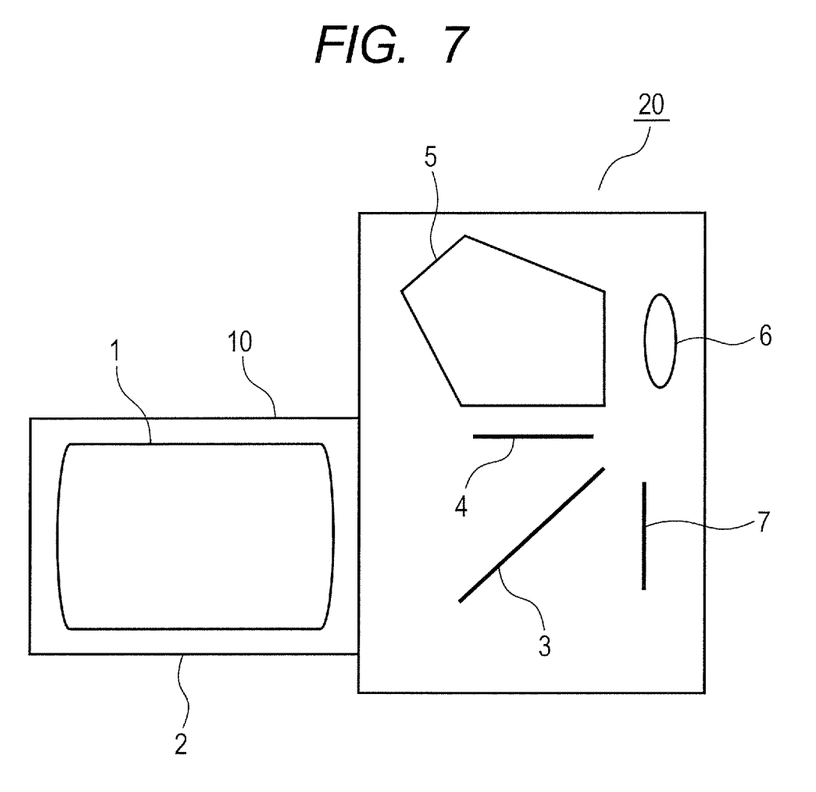
FIG. 7 is a schematic diagram of a main part of an image pickup apparatus according to the present invention.

FIG. 3 is a lens cross-sectional view at a wide angle end of a zoom lens according to Embodiment 2 of the present invention. FIG. 4A and FIG. 4B are longitudinal aberration diagrams in focus at infinity at the wide angle end and at a telephoto end, respectively, of the zoom lens of Embodiment 2. FIG. 5 is a lens cross-sectional view at a wide angle end of a zoom lens of according to Embodiment of the present invention. FIG. 6A and FIG. 6B are longitudinal aberration diagrams in focus at infinity at the wide angle end and at a telephoto end, respectively, of the zoom lens of Embodiment 3. FIG. 7 is a schematic diagram of a main part of an image pickup apparatus according to the present invention.

The zoom lens of each embodiment is an imaging optical system (optical system) used for image pickup apparatus such as a video camera, a digital camera, and a silver-halide film camera. In the lens cross-sectional view, the left side is the object side (front), and the right side is the image side (rear). Further, the zoom lens of each embodiment may be used for a projector. In this case, the left side is a screen side, and the right side is a projected image side. The lens cross-sectional view illustrates a zoom lens OL. Symbol i represents an order of a lens unit from the object side, and Li represents the i-th lens unit.

An image stabilizing lens unit (image stabilizing unit) Ls includes a second lens unit L2 or at least a part of the second lens unit L2, which is configured to move so that the image stabilizing lens unit has a component perpendicular to the optical axis for image stabilization.

An aperture stop SP is arranged on the image side of the image stabilizing lens unit Ls. An image plane IP corresponds to an imaging plane of a solid-state image pickup element (photoelectric transducer element) such as a CCD sensor or a CMOS sensor when the zoom lens is used as an imaging optical system of a video camera or a digital still camera, and corresponds to a film plane in a case of a silver-halide film camera. The zoom lens OL has an optical axis OA. An arrow indicates a direction of movement for zooming from the wide angle end to the telephoto end. An arrow concerning focus indicates a movement direction in focusing from infinity to close distance.

Now, with reference to FIG. 1, the zoom lens OL of Embodiment 1 of the present invention is described. The zoom lens OL of Embodiment 1 includes, in order from the object side to the image side, a first lens unit L1 having a negative refractive power, a second lens unit L2 having a positive refractive power, a third lens unit L3 having a negative refractive power, and a fourth lens unit L4 having a positive refractive power. In zooming from the wide angle end to the telephoto end, the first lens unit L1 moves along a locus convex to the image side, while the second lens unit L2, the third lens unit L3, and the fourth lens unit L4 move to the object side along in different loci.

In this zoom lens OL, a part of the second lens unit L2 is the image stabilizing lens unit Ls. The third lens unit L3 is a focus lens unit LF, which is configured to move to the image side along the optical axis in focusing from infinity to close distance.

Now, with reference to FIG. 3, the zoom lens OL of Embodiment 2 of the present invention is described. The zoom lens OL of Embodiment 2 includes, in order from the object side to the image side, the first lens unit L1 having a negative refractive power, and the second lens unit L2 having a positive refractive power. In zooming from the wide angle end to the telephoto end, the first lens unit L1 moves along a locus convex to the image side, and the second lens unit L2 moves to the object side. In this zoom lens OL, a part of the second lens unit L2 is the image stabilizing lens unit Ls. In addition, a part of the second lens unit L2 is the focus lens unit LF, which is configured to move to the image side along the optical axis in focusing from infinity to close distance.

Now, with reference to FIG. 5, the zoom lens OL of Embodiment 3 of the present invention is described. The zoom lens OL of Embodiment 3 includes, in order from the object side to the image side, the first lens unit L1 having a negative refractive power, the second lens unit L2 having a positive refractive power, the third lens unit L3 having a positive refractive power, the fourth lens unit L4 having a negative refractive power, and the fifth lens unit L5 having a positive refractive power.

In zooming from the wide angle end to the telephoto end, the first lens unit L1 moves along a locus convex to the image side, and the second lens unit L2 to the fifth lens unit L5 move to the object side along different loci. In this zoom lens OL, the second lens unit L2 is the image stabilizing lens unit Ls. In addition, the fourth lens unit L4 is the focus lens unit LF, which is configured to move to the image side along the optical axis in focusing from infinity to close distance. Further, in the following embodiments, the wide angle end and the telephoto end mean zoom positions when the zooming lens unit is positioned at each end in a mechanically movable range on the optical axis.

In a spherical aberration diagram, a solid line indicates a d-line (587.6 nm), and a double-dotted dashed line indicates a g-line (435.8 nm). In addition, in the diagram illustrating astigmatism, a solid line indicates an aberration of the d-line in a sagittal direction S, and a broken line indicates an aberration of the d-line in a meridional direction M. In addition, the diagram illustrating a distortion illustrates a distortion on the d-line. Fno represents an F-number, and ω represents a half angle of field (degrees).

In each embodiment, the following conditional expressions are satisfied:

$$6.0 < f_{Ls}/f_W < 30.0 \quad (1); \text{ and}$$

$$-3.0 < f_{Lr}/f_1 < -2.0 \quad (2),$$

where $f_1$ represents a focal length of the first lens unit L1, $f_{Ls}$ represents a focal length of the image stabilizing lens unit Ls, $f_{Lr}$ represents a combination focal length of an optical system Lr arranged closer to the image side than the image stabilizing lens unit Ls at the wide angle end, and $f_W$ represents a focal length of the entire system at the wide angle end.

Next, technical meanings of the conditional expressions (1) and (2) are described. The conditional expression (1) is obtained through normalization in which the focal length $f_{Ls}$ of the image stabilizing lens unit Ls is divided by the focal length of the entire system at the wide angle end. In order to maintain good optical performance in image stabilization, it is better that the refractive power of the image stabilizing lens unit Ls is weaker, but in this case, image stabilization sensitivity is decreased. As a result, a movement amount of the image stabilizing lens unit Ls for correcting a predetermined image blur amount is increased, and hence the driving device for driving the image stabilizing lens unit Ls becomes large, which is not preferred. On the contrary, if the refractive power of the image stabilizing lens unit Ls is increased, the image stabilization sensitivity is increased so that the movement amount of the image stabilizing lens unit Ls for image stabilization can be maintained to be small, but it becomes difficult to maintain good optical performance in image stabilization, which is not preferred.

If the value exceeds the upper limit of the conditional expression (1), the refractive power of the image stabilizing lens unit Ls becomes too weak so that the driving device becomes large, which is not preferred. In addition, if the value falls below the lower limit of the conditional expression (1), the refractive power of the image stabilizing lens unit Ls becomes too strong so that it becomes difficult to maintain good optical performance in image stabilization, which is not preferred. The conditional expression (2) is obtained through normalization in which the combination focal length $f_{Lr}$ of the entire system at the wide angle end of the optical system Lr closer to the image side than the image stabilizing lens unit Ls is divided by the focal length $f_1$ of the first lens unit L1.

A so-called negative lead type zoom lens including a lens unit having a negative refractive power arranged on the most object side can shorten the entire lens length (distance from the first lens surface to the image plane) while maintaining a long back focus by increasing the negative refractive power. Further, it becomes easy to realize a wider angle of field.

If the value falls below the lower limit of the conditional expression (2) so that an absolute value of the negative refractive power of the first lens unit L1 is increased, field curvature or coma is increased, and hence it becomes difficult to correct the aberrations, which is not preferred. On the contrary, if the value exceeds the upper limit of the conditional expression (2) so that an absolute value of the negative refractive power of the first lens unit L1 is decreased, the entire lens length is increased, and it becomes difficult to realize a wider angle of field, which is not preferred. When the conditional expressions (1) and (2) are simultaneously satisfied, it is possible to realize downsizing of the image stabilizing lens unit and the entire driving device while maintaining good optical performance in image stabilization. It is more preferred to set the value ranges of the conditional expressions (1) and (2) as follows.

$$6.0 < f_{Ls}/f_W < 20.0 \quad (1a)$$

$$-3.0 < f_{Lr}/f_1 < -2.1 \quad (2a)$$

It is more preferred to set the value ranges of the conditional expressions (1a) and (2a) as follows.

$$7.0 < f_{Ls}/f_W < 16.0 \quad (1b)$$

$$-2.80 < f_{Lr}/f_1 < -2.15 \quad (2b)$$

As described above, according to each embodiment, it is possible to provide a small size and high performance zoom lens having little variation of optical performance in image stabilization.

It is preferred in each embodiment to satisfy at least one of the following conditional expressions:

$$0.5 < T_{1smin}/f_W < 1.4 \quad (3);$$

$$vd_{Ls} > 35.0 \quad (4); \text{ and}$$

$$2.2 < BF_W/f_W < 5.0 \quad (5).$$

Here, the aperture stop SP is arranged on the image side of the image stabilizing lens unit Ls, and $T_{1smin}$ represents a minimum value of an interval between the first lens unit L1 and the aperture stop SP on the optical axis in zooming from the wide angle end to the telephoto end. The image stabilizing lens unit Ls consists of a single positive lens, and $vd_{Ls}$ represents an Abbe constant of the material of the positive lens. $BF_W$ represents the back focus at the wide angle end.

Next, technical meaning of each conditional expression is described.

The conditional expression (3) defines a ratio of the focal length of the entire system at the wide angle end to the minimum value of the interval between the first lens unit L1 and the aperture stop SP on the optical axis in zooming from the wide angle end to the telephoto end. The conditional expression (3) is a conditional expression for locating the image stabilizing lens unit Ls at an appropriate position. Because the image stabilizing lens unit Ls moves in the direction having the component perpendicular to the optical axis, it is necessary to arrange a lens holding frame and a drive system for driving the lens holding frame (hereinafter also referred to integrally as an image stabilizing device) around the image stabilizing lens unit Ls. Therefore, a certain size of space is necessary for arranging the image stabilizing lens unit Ls.

If the value exceeds the upper limit of the conditional expression (3), it is possible to secure sufficient space for arranging the image stabilizing device, but the entire image pickup apparatus becomes large, which is not preferred. If the value falls below the lower limit of the conditional expression (3), the space for arranging the image stabilizing lens unit Ls including the image stabilizing device becomes small, which is not preferred. It is more preferred to set the value range of the conditional expression (3) as follows.

$$0.6 < T_{1smin}/f_W < 1.3 \quad (3a)$$

It is more preferred to set the value range of the conditional expression (3a) as follows.

$$0.7 < T_{1smin}/f_W < 1.2 \quad (3b)$$

In addition, because the image stabilizing lens unit Ls consists of the single positive lens in the zoom lens of the present invention, a weight of the image stabilizing lens unit is reduced so that an increase of size of the image stabilizing device is prevented.

The conditional expression (4) defines a value range of an Abbe constant of a material of the positive lens constituting the image stabilizing lens unit Ls and is a conditional expression for maintaining good optical performance mainly in image stabilization.

In general, if a single lens is decentered from the optical axis in parallel, decentering lateral chromatic aberration is generated. The amount of the generated decentering lateral chromatic aberration becomes larger as the material of the lens has higher dispersion. Therefore, when the image stabilizing lens unit Ls consists of the single lens, it is preferred to use a low dispersion material satisfying the conditional expression (4) in order to maintain good optical performance. It is more preferred to set the value range of the conditional expression (4) as follows.

$$\nu d_{Ls} > 55.0 \quad (4a)$$

It is more preferred to set the value range of the conditional expression (4a) as follows.

$$\nu d_{Ls} > 60.0 \quad (4b)$$

The conditional expression (5) is obtained through normalization in which a back focus $BF_W$ at the wide angle end is divided by a focal length of the entire system at the wide angle end. If the value exceeds the upper limit of the conditional expression (5), the back focus becomes too long, and the zoom lens becomes large, which is not preferred. If the value falls below the lower limit of the conditional expression (5), the back focus becomes too short. As a result, when the zoom lens of the present invention is used as an imaging optical system for a digital single-lens reflex camera, for example, it becomes difficult to arrange an optical member on the image side of the zoom lens. In addition, an exit pupil position moves to the image side so that the telecentric characteristic to the image side is lowered, which is not preferred. It is more preferred to set the value range of the conditional expression (5) as follows.

$$2.5 < BF_W/f_W < 4.5 \quad (5a)$$

It is more preferred to set the value range of the conditional expression (5a) as follows.

$$3.0 < BF_W/f_W < 4.1 \quad (5b)$$

Next, a preferred structure in each embodiment is described.

In addition, in the zoom lens of each embodiment, the first lens unit L1 includes a lens having an aspheric surface. By arranging the lens having an aspheric surface in the first lens unit L1, it is easy to appropriately correct various aberrations, particularly field curvature, which can be easily generated in a retrofocus type optical arrangement. In addition, it is preferred to arrange the focus lens unit on the image side of the aperture stop SP.

The zoom lens of each embodiment includes, in order from the object side to the image side, the first lens unit having a negative refractive power, and the second lens unit L2 having a positive refractive power, and a whole of the second lens unit L2 or a part of the second lens unit L2 is the image stabilizing lens unit Ls. Further, it is preferred to arrange the aperture stop SP on the image side of the image stabilizing lens unit Ls and to arrange the focus lens unit on the image side of the aperture stop SP.

Now, a feature of this arrangement is described. In order to move the image stabilizing lens unit, the aperture stop, and the focus lens unit in the zoom lens including the image stabilizing lens unit, the aperture stop, and the focus lens unit, it is necessary to arrange drive systems in the zoom lens. In order to arrange the drive systems, it is necessary to secure a space for arranging the drive systems in the zoom lens. In the following, a mechanism including the image stabilizing lens unit, the drive system thereof, a holding member, and the like is referred to as the image stabilizing device. A mechanism including the aperture stop, the drive system thereof, a holding member, and the like is referred to as an aperture device. A mechanism including the focus lens unit, the drive system thereof, a holding member, and the like is referred to as a focus device.

Here, because the image stabilizing lens unit is moved in a direction having a component perpendicular to the optical axis, the image stabilizing device may become large in the direction perpendicular to the optical axis.

In addition, because the opening diameter is changed, the aperture device may become large in the direction perpendicular to the optical axis. Here, because a drive range of the aperture stop is set within a range through which an effective light beam passes, the image stabilizing device may become larger in the direction perpendicular to the optical axis than the aperture device. In addition, because the focus lens unit is moved in the optical axis direction, the focus device may become large in the optical axis direction.

In general, if a mechanism having a large diameter in the direction perpendicular to the optical axis is arranged on the image plane side of the image pickup apparatus, the image pickup apparatus may be large on the object side, which is not preferred. In order to downsize the entire image pickup apparatus, it is preferred to arrange the mechanism having a large diameter in the direction perpendicular to the optical axis more closely to the object side. As described above, by arranging the image stabilizing device, the aperture device, and the focus device in order from the object side to the image side, it is possible to efficiently utilize the space in the image pickup apparatus, and it is possible to prevent the image pickup apparatus from being large.

FIG. 7 is a schematic diagram of a main part of a single-lens reflex camera. In FIG. 7, an imaging optical system 10 includes a zoom lens 1 of any one of Embodiments 1 to 3. The imaging optical system 10 is held by a lens barrel 2 as a holding member. A camera main body 20 includes a quick return mirror 3, a focus plate 4, a penta roof prism 5, and an eyepiece lens 6.

The quick return mirror 3 reflects upward a light beam from the imaging optical system 10. The focus plate 4 is arranged at an image forming position of the imaging optical system 10. The penta roof prism 5 converts an inverse image formed on the focus plate 4 into an erect image. An observer observes the erect image via the eyepiece lens 6. As a photosensitive plane 7, there is arranged a solid-state image pickup element (photoelectric transducer) such as a CCD sensor or a CMOS sensor for receiving the image, or a silver-halide film. When taking an image, the quick return mirror 3 is retracted from the optical path, and an image is formed on the photosensitive plane 7 by the imaging optical system 10.

In this way, by applying the zoom lens of the present invention to an image pickup apparatus such as an interchangeable lens for a single-lens reflex camera or the like, it is possible to provide optical equipment having high optical performance. Other than that, the zoom lens of the present invention can be similarly applied to a mirrorless single-lens reflex camera having no quick return mirror. Other than that, the zoom lens of the present invention can be applied not only to a digital camera, a video camera, a silver-halide film camera but also optical equipment such as a telescope, binoculars, a copying machine, and a projector.

The exemplary embodiments of the present invention are described above, but the present invention is not limited to these embodiments and can be modified and changed variously within the scope of the gist thereof.

Now, there are described specific numerical data of the zoom lenses of Numerical Embodiments 1 to 3 corresponding to Embodiments 1 to 3. Symbol i represents an order from the object side. The surface number i is an order from the object side. Symbol ri represents a radius of curvature, di represents an interval between the i-th surface and the (i+1)th surface. Symbols ndi and vdi respectively represent a refractive index and an Abbe constant of a medium between the i-th surface and the (i+1)th surface with respect to the d-line. In addition, BF represents the back focus. The entire lens length is a distance from the first lens surface to the image plane.

In addition, an aspheric surface is indicated by a suffix "*" of the surface number. An aspheric surface shape is expressed by the following equation, $$X=(h^2/R)/[1+\{1-(1+k)(h/R)^2\}^{1/2}+B \cdot h^4+C \cdot h^6+D \cdot h^8+E \cdot h^{10}+F \cdot h^{12}+\ldots]$$

where X represents a displacement from a surface vertex in the optical axis direction, h represents a height from the optical axis in the direction perpendicular to the optical axis, R represents a paraxial curvature radius, k represents a conic constant, and B, C, D, E, F, represent aspheric coefficients of individual orders. Further, "e±XX" in each aspheric coefficient means "×10$^{\pm XX}$". Values of parameters relating to the individual conditional expressions described above are shown in Table 1. Values corresponding to the individual conditional expressions are shown in Table 2.

Numerical Embodiment 1

| Unit mm | | | | |
|---|---|---|---|---|
| Surface data | | | | |
| Surface number | r | d | nd | vd |
| 1 | 55.999 | 1.20 | 1.77250 | 49.6 |
| 2 | 18.939 | 0.21 | | |
| 3 | 18.794 | 3.00 | 1.52996 | 55.8 |
| 4* | 12.302 | 13.97 | | |
| 5 | 27.078 | 0.85 | 1.77250 | 49.6 |
| 6 | 11.734 | 5.86 | | |
| 7 | −18.556 | 0.86 | 1.59522 | 67.7 |
| 8 | −193.388 | 0.15 | | |
| 9 | 43.637 | 3.35 | 1.72047 | 34.7 |
| 10 | −36.162 | (Variable) | | |
| 11 | −51.134 | 1.22 | 1.48749 | 70.2 |
| 12 | −31.161 | 1.29 | | |
| 13 | 24.670 | 0.80 | 1.91082 | 35.3 |
| 14 | 10.275 | 2.98 | 1.60342 | 38.0 |
| 15 | −52.144 | 2.17 | | |
| 16 (Stop) | ∞ | 4.04 | | |
| 17 | −69.148 | 0.80 | 1.83481 | 42.7 |
| 18 | 10.223 | 3.33 | 1.64769 | 33.8 |
| 19 | −84.530 | 0.15 | | |
| 20 | 16.445 | 4.22 | 1.49700 | 81.5 |
| 21 | −16.445 | (Variable) | | |
| 22 | −43.861 | 0.70 | 1.91082 | 35.3 |
| 23 | 54.842 | (Variable) | | |
| 24 | 83.184 | 0.80 | 1.91082 | 35.3 |
| 25 | 12.879 | 7.14 | 1.58313 | 59.4 |
| 26* | −19.588 | (Variable) | | |
| Image plane | ∞ | | | |

| Aspherical surface data |
|---|
| Fourth surface |

| k = −4.75949e−001 | B = −3.84236e−005 | C = −7.63390e−008 |
|---|---|---|
| D = −6.26237e−010 | E = 3.48984e−012 | F = −1.12759e−014 |

Twenty-sixth surface

| k = 0.00000e+000 | B = 1.25041e−005 | C = −1.14292e−007 |
|---|---|---|
| D = 4.98491e−009 | E = −1.03089e−010 | F = 7.40509e−013 |

| Various data |
|---|
| Zoom ratio 1.70 |

| | Wide angle | Intermediate | Telephoto |
|---|---|---|---|
| Focal length | 10.30 | 13.96 | 17.46 |
| F-number | 4.64 | 5.19 | 5.71 |
| Half angle of field (degree) | 52.98 | 44.37 | 38.04 |
| Image height | 13.66 | 13.66 | 13.66 |
| Total lens length | 117.61 | 114.39 | 115.20 |
| BF | 35.35 | 42.66 | 49.42 |
| d10 | 18.12 | 7.58 | 1.64 |

-continued

| Unit mm | | | |
|---|---|---|---|
| d21 | 1.25 | 1.57 | 1.90 |
| d23 | 3.80 | 3.48 | 3.15 |
| d26 | 35.35 | 42.66 | 49.42 |

Zoom lens unit data

| Unit | First surface | Focal length | Lens structure length | Front principal point position | Rear principal point position |
|---|---|---|---|---|---|
| 1 | 1 | −13.43 | 29.45 | 6.16 | −20.30 |
| 2 | 11 | 19.23 | 21.01 | 13.78 | −5.64 |
| 3 | 22 | −26.67 | 0.70 | 0.16 | −0.20 |
| 4 | 24 | 58.19 | 7.94 | 8.00 | 3.51 |

Single lens data

| Lens | First surface | Focal length |
|---|---|---|
| 1 | 1 | −37.58 |
| 2 | 3 | −80.00 |
| 3 | 5 | −27.47 |
| 4 | 7 | −34.55 |
| 5 | 9 | 27.94 |
| 6 | 11 | 160.44 |
| 7 | 13 | −19.86 |
| 8 | 14 | 14.48 |
| 9 | 17 | −10.62 |
| 10 | 18 | 14.28 |
| 11 | 20 | 17.28 |
| 12 | 22 | −26.67 |
| 13 | 24 | −16.82 |
| 14 | 25 | 14.50 |

Numerical Embodiment 2

| Unit mm | | | | |
|---|---|---|---|---|
| Surface data | | | | |
| Surface number | r | d | nd | vd |
| 1 | 35.862 | 1.50 | 1.71300 | 53.9 |
| 2 | 23.310 | 0.50 | | |
| 3 | 23.414 | 3.00 | 1.52996 | 55.8 |
| 4* | 14.722 | 12.57 | | |
| 5 | 123.956 | 0.85 | 1.77250 | 49.6 |
| 6 | 11.755 | 7.12 | | |
| 7 | −18.676 | 0.86 | 1.49700 | 81.5 |
| 8 | −48.359 | 0.15 | | |
| 9 | 38.936 | 3.16 | 1.72047 | 34.7 |
| 10 | −57.611 | (Variable) | | |
| 11 | −77.867 | 1.88 | 1.51633 | 64.1 |
| 12 | −28.186 | 2.00 | | |
| 13 | 35.793 | 0.50 | 1.91082 | 35.3 |
| 14 | 10.747 | 3.50 | 1.60342 | 38.0 |
| 15 | −127.874 | 2.65 | | |
| 16 (Stop) | ∞ | 5.25 | | |
| 17 | −43.766 | 0.50 | 1.83481 | 42.7 |
| 18 | 15.565 | 3.61 | 1.64769 | 33.8 |
| 19 | −36.147 | 0.10 | | |
| 20 | 19.132 | 4.54 | 1.43875 | 94.9 |
| 21 | −21.137 | 1.36 | | |
| 22 | 70.757 | 0.70 | 1.91082 | 35.3 |
| 23 | 39.269 | 5.44 | | |
| 24 | 980.927 | 0.70 | 1.91082 | 35.3 |

-continued

| Unit mm | | | | |
|---|---|---|---|---|
| 25 | 18.360 | 5.37 | 1.55332 | 71.7 |
| 26* | −23.613 | (Variable) | | |
| Image plane | ∞ | | | |

Aspherical surface data

Fourth surface k = −4.75949e−001  B = −1.67479e−005  C = −5.40616e−008
D = −8.20153e−011  E = −3.06075e−013  F = 2.34339e−016

Twenty-sixth surface k = 0.00000e+000  B = 2.08270e−005  C = 5.31382e−008
D = 2.40645e−009  E = −3.84097e−011  F = 3.69188e−013

Various data

Zoom ratio 1.54

| | Wide angle | Intermediate | Telephoto |
|---|---|---|---|
| Focal length | 11.30 | 14.50 | 17.46 |
| F-number | 4.64 | 5.16 | 5.63 |
| Half angle of field (degree) | 50.40 | 43.29 | 38.04 |
| Image height | 13.66 | 13.66 | 13.66 |
| Total lens length | 120.15 | 116.73 | 116.65 |
| BF | 35.33 | 41.34 | 46.90 |
| d10 | 17.02 | 7.59 | 1.95 |
| d26 | 35.33 | 41.34 | 46.90 |

Zoom lens unit data

| Unit | First surface | Focal length | Lens structure length | Front principal point position | Rear principal point position |
|---|---|---|---|---|---|
| 1 | 1 | −16.03 | 29.71 | 8.94 | −19.48 |
| 2 | 11 | 30.11 | 38.09 | 20.29 | −16.02 |

Single lens data

| Lens | First surface | Focal length |
|---|---|---|
| 1 | 1 | −98.30 |
| 2 | 3 | −85.00 |
| 3 | 5 | −16.87 |
| 4 | 7 | −61.81 |
| 5 | 9 | 32.70 |
| 6 | 11 | 84.47 |
| 7 | 13 | −17.03 |
| 8 | 14 | 16.59 |
| 9 | 17 | −13.70 |
| 10 | 18 | 17.27 |
| 11 | 20 | 23.70 |
| 12 | 22 | −97.92 |
| 13 | 24 | −20.55 |
| 14 | 25 | 19.56 |

Numerical Embodiment 3

| Unit mm | | | | |
|---|---|---|---|---|
| Surface data | | | | |
| Surface number | r | d | nd | νd |
| 1 | 52.396 | 1.70 | 1.72916 | 54.7 |
| 2 | 31.391 | 0.50 | | |
| 3 | 31.434 | 3.00 | 1.52996 | 55.8 |
| 4* | 19.441 | 20.00 | | |
| 5 | 75.910 | 1.00 | 1.88300 | 40.8 |
| 6 | 14.489 | 8.32 | | |

-continued

| Unit mm | | | | |
|---|---|---|---|---|
| 7 | −22.575 | 1.00 | 1.59522 | 67.7 |
| 8 | 231.982 | 0.15 | | |
| 9 | 64.130 | 3.98 | 1.72047 | 34.7 |
| 10 | −32.388 | (Variable) | | |
| 11 | −64.356 | 1.87 | 1.48749 | 70.2 |
| 12 | −26.659 | (Variable) | | |
| 13 | 24.225 | 0.50 | 1.91082 | 35.3 |
| 14 | 11.816 | 3.31 | 1.60342 | 38.0 |
| 15 | −165.873 | 1.94 | | |
| 16 (Stop) | ∞ | 6.87 | | |
| 17 | −12.779 | 0.50 | 1.88300 | 40.8 |
| 18 | 14.863 | 3.88 | 1.64769 | 33.8 |
| 19 | −14.534 | 0.10 | | |
| 20 | 23.873 | 3.94 | 1.43875 | 94.9 |
| 21 | −14.243 | (Variable) | | |
| 22 | −184.591 | 0.70 | 1.91082 | 35.3 |
| 23 | 56.934 | (Variable) | | |
| 24 | 54.627 | 0.70 | 1.91082 | 35.3 |
| 25 | 15.840 | 4.36 | 1.55332 | 71.7 |
| 26* | −33.715 | (Variable) | | |
| Image plane | ∞ | | | |

Aspherical surface data

Fourth surface

| k = −4.75949e−001 | B = −8.83418e−006 | C = −2.62348e−009 |
|---|---|---|
| D = −6.11182e−011 | E = 1.11613e−013 | F = −1.08535e−016 |

Twenty-sixth surface

| k = 0.00000e+000 | B = 8.69320e−006 | C = −5.05138e−008 |
|---|---|---|
| D = 2.89866e−009 | E = −5.15025e−011 | F = 3.95150e−013 |

Various data

Zoom ratio 2.07

| Focal length | 9.50 | 14.52 | 19.70 | 11.59 | 17.52 |
|---|---|---|---|---|---|
| F-number | 4.64 | 5.21 | 5.80 | 4.88 | 5.55 |
| Half angle of field (degree) | 55.17 | 43.26 | 34.74 | 49.68 | 37.95 |
| Image height | 13.66 | 13.66 | 13.66 | 13.66 | 13.66 |
| Total lens length | 143.95 | 134.71 | 134.11 | 138.45 | 133.69 |
| BF | 38.00 | 47.58 | 56.42 | 42.24 | 52.74 |
| d10 | 29.73 | 10.89 | 1.43 | 19.99 | 4.71 |
| d12 | 1.84 | 1.46 | 1.10 | 1.67 | 1.25 |
| d21 | 1.36 | 2.28 | 3.65 | 1.60 | 3.08 |
| d23 | 4.71 | 4.19 | 3.19 | 4.64 | 3.61 |
| d26 | 38.00 | 47.58 | 56.42 | 42.24 | 52.74 |

Zoom lens unit data

| Unit | First surface | Focal length | Lens structure length | Front principal point position | Rear principal point position |
|---|---|---|---|---|---|
| 1 | 1 | −15.01 | 39.65 | 13.64 | −21.90 |
| 2 | 11 | 91.87 | 1.87 | 2.11 | 0.88 |
| 3 | 13 | 28.31 | 21.03 | 18.43 | −1.21 |
| 4 | 22 | −47.71 | 0.70 | 0.28 | −0.09 |
| 5 | 24 | 92.43 | 5.06 | 4.08 | 0.93 |

Single lens data

| Lens | First surface | Focal length |
|---|---|---|
| 1 | 1 | −111.18 |
| 2 | 3 | −105.26 |
| 3 | 5 | −20.44 |
| 4 | 7 | −34.51 |
| 5 | 9 | 30.39 |
| 6 | 11 | 91.87 |
| 7 | 13 | −25.82 |
| 8 | 14 | 18.41 |
| 9 | 17 | −7.72 |
| 10 | 18 | 11.97 |

-continued

| Unit mm | | |
|---|---|---|
| 11 | 20 | 20.99 |
| 12 | 22 | −47.71 |
| 13 | 24 | −24.71 |
| 14 | 25 | 20.11 |

TABLE 1

|  | Embodiment 1 | Embodiment 2 | Embodiment 3 |
|---|---|---|---|
| $f_{Ls}$ | 160.44 | 84.47 | 91.87 |
| $f_1$ | −13.41 | −16.03 | −15.01 |
| $f_{Lr}$ | 33.06 | 34.98 | 40.63 |
| $f_W$ | 10.30 | 11.30 | 9.50 |
| $T_{1smin}$ | 10.10 | 12.48 | 10.14 |
| $BF_w$ | 35.35 | 35.33 | 38.00 |
| $vd_{Ls}$ | 70.23 | 64.14 | 70.23 |

TABLE 2

| Conditional Expression | Embodiment 1 | Embodiment 2 | Embodiment 3 |
|---|---|---|---|
| (1) | 15.58 | 7.47 | 9.67 |
| (2) | −2.47 | −2.18 | −2.71 |
| (3) | 0.98 | 1.10 | 1.07 |
| (4) | 70.23 | 64.14 | 70.23 |
| (5) | 3.43 | 3.13 | 4.00 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-162437, filed Aug. 5, 2013, which is hereby incorporated by reference herein in its entirety.

What is claimed is:

1. A zoom lens comprising, in order from an object side to an image side:
a first lens unit having a negative refractive power;
a second lens unit having a positive refractive power,
wherein an entirety of the second lens unit or a part of the second lens unit constitutes an image stabilizing lens unit configured to move in a direction having a component perpendicular to an optical axis for image stabilization;
wherein the zoom lens being configured to change an interval between adjacent lens units during zooming; and
wherein an aperture stop arranged in the image side of the first lens unit,
wherein the following conditional expressions are satisfied:

$$6.0 \leq f_{Ls}/f_W < 30.0; \text{ and}$$

$$-3.0 \leq f_{Lr}/f_1 < -2.0,$$

where $f_1$ represents a focal length of the first lens unit, $f_{Ls}$ represents a focal length of the image stabilizing lens unit, $f_{Lr}$ represents a focal length at a wide angle end of an optical system Lr arranged on the image side of the image stabilizing lens unit, and $f_W$ represents a focal length of an entire system at the wide angle end.

2. A zoom lens according to claim 1, wherein the aperture stop is arranged on the image side of the image stabilizing lens unit, and the following conditional expression is satisfied:

$$0.5 < T_{1smin}/f_W < 1.4,$$

where $T_{1smin}$ represents a minimum value of an interval between the first lens unit and the aperture stop on the optical axis in zooming from the wide angle end to a telephoto end.

3. A zoom lens according to claim 1, wherein the image stabilizing lens unit consists of a single positive lens.

4. A zoom lens according to claim 3, wherein the following conditional expression is satisfied:

$$vd_{Ls} > 35.0,$$

where $vd_{Ls}$ represents an Abbe constant of a material of the single positive lens in the image stabilizing lens unit.

5. A zoom lens according to claim 1, wherein the following conditional expression is satisfied:

$$2.2 < BF_W/f_W < 5.0,$$

where $BF_W$ represents a back focus at the wide angle end.

6. A zoom lens according to claim 1, further comprising a focus lens unit, which is configured to move on the optical axis during focusing, the focus lens unit being arranged in the image side of the aperture stop.

7. A zoom lens according to claim 1, wherein the zoom lens consists of, in order from the object side to the image side, the first lens unit having the negative refractive power, the second lens unit having the positive refractive power, a third lens unit having a negative refractive power, and a fourth lens unit having a positive refractive power.

8. A zoom lens according to claim 1, wherein the zoom lens consists of, in order from the object side to the image side, the first lens unit having the negative refractive power, and the second lens unit having the positive refractive power.

9. A zoom lens according to claim 1, wherein the zoom lens consists of, in order from the object side to the image side, the first lens unit having the negative refractive power, the second lens unit having the positive refractive power, a third lens unit having a positive refractive power, a fourth lens unit having a negative refractive power, and a fifth lens unit having a positive refractive power.

10. An image pickup apparatus, comprising:
a zoom lens; and
an image sensor configured to receive an image formed by the zoom lens,
wherein the zoom lens comprises:
a first lens unit having a negative refractive power;
a second lens unit having a positive refractive power in an image side of the first lens unit, at least a part of the second lens unit constituting an image stabilizing lens unit configured to move to have a component perpendicular to an optical axis for image stabilization;
the zoom lens being configured to change an interval between neighboring lens units during zooming; and an aperture stop arranged in the image side of the first lens unit, and wherein the following conditional expressions are satisfied:

$$6.0 < f_{Ls}/f_W < 30.0; \text{ and}$$

$$-3.0 < f_{Lr}/f_1 < -2.0,$$

where $f_1$ represents a focal length of the first lens unit, $f_{Ls}$ represents a focal length of the image stabilizing lens unit, $f_{Lr}$ represents a focal length at a wide angle end of an optical system Lr arranged on the image side of the image stabilizing lens unit, and $f_W$ represents a focal length of an entire system at the wide angle end.

* * * * *